United States Patent
Zhang et al.

(10) Patent No.: US 9,589,426 B2
(45) Date of Patent: Mar. 7, 2017

(54) CARD SUBSTITUTION PREVENTION METHOD AND APPARATUS FOR SELF-SERVICE TERMINAL

(71) Applicant: GRG Banking Equipment Co., Ltd., Guangzhou, Guangdong (CN)

(72) Inventors: Hongshuai Zhang, Guangdong (CN); Xiaohua Deng, Guangdong (CN); Lihua Wang, Guangdong (CN); Zhe Li, Guangdong (CN); Jianhui Zhou, Guangdong (CN); Qinghua Wang, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 14/916,372

(22) PCT Filed: Oct. 13, 2014

(86) PCT No.: PCT/CN2014/088461
§ 371 (c)(1),
(2) Date: Mar. 3, 2016

(87) PCT Pub. No.: WO2015/127783
PCT Pub. Date: Sep. 3, 2015

(65) Prior Publication Data
US 2016/0225236 A1    Aug. 4, 2016

(30) Foreign Application Priority Data
Feb. 26, 2014    (CN) .......................... 2014 1 0067122

(51) Int. Cl.
*G06Q 40/00* (2012.01)
*G07D 11/00* (2006.01)
(Continued)

(52) U.S. Cl.
CPC ....... *G07F 19/204* (2013.01); *G06Q 20/1085* (2013.01); *G07F 19/00* (2013.01); *G07F 19/2055* (2013.01); *G07F 19/21* (2013.01)

(58) Field of Classification Search
CPC ........ G06Q 40/00; G07D 11/00; G07F 19/00; G06F 17/00; G06K 13/00
(Continued)

(56) References Cited

U.S. PATENT DOCUMENTS

2004/0035929 A1* 2/2004 Okada ................. G06K 13/067
                                                                235/438
2004/0089723 A1    5/2004 Moriya
(Continued)

FOREIGN PATENT DOCUMENTS

CN    1479247 A    3/2004
CN    1983304 A    6/2007
(Continued)

OTHER PUBLICATIONS

International Search Report for PCT/CN2014/088461, mailed Jan. 21, 2015, ISA/CN.

*Primary Examiner* — Edwyn Labaze
(74) *Attorney, Agent, or Firm* — U.S. Fairsky LLP; Yue Xu

(57) ABSTRACT

A card substitution prevention method for a self-service terminal includes performing, by a card feeding portion of the self-service terminal, an alteration operation in the case that a card exists in a card reader of the self-service terminal, to make the card feeding portion unable to receive another card and prevent the another card from being placed in the card feeding portion. Also provided is a card substitution prevention apparatus for a self-service terminal. The method can effectively protect a card of a customer and prevent the card of the customer from being stealthily substituted,
(Continued)

thereby improving service quality of a self-service terminal and maintaining trade credit of a merchant.

10 Claims, 6 Drawing Sheets

(51) Int. Cl.
   *G07F 19/00* (2006.01)
   *G06Q 20/10* (2012.01)
(58) Field of Classification Search
   USPC .......... 235/379, 375, 382, 475, 476; 705/43
   See application file for complete search history.

(56) References Cited

U.S. PATENT DOCUMENTS

| | | | |
|---|---|---|---|
| 2006/0086793 A1* | 4/2006 | Oguchi | G06K 13/08 235/441 |
| 2006/0138241 A1* | 6/2006 | Kitazawa | G06K 13/067 235/475 |
| 2007/0158432 A1 | 7/2007 | Tadamasa | |
| 2013/0307209 A1 | 11/2013 | Nakata et al. | |
| 2015/0136850 A1* | 5/2015 | Akahane | G06K 13/067 235/438 |

FOREIGN PATENT DOCUMENTS

| | | |
|---|---|---|
| CN | 201392539 Y | 1/2010 |
| CN | 102236933 A | 11/2011 |
| CN | 202339597 U | 7/2012 |
| CN | 103400457 A | 11/2013 |
| CN | 103824391 A | 5/2014 |
| DE | 3313355 C2 | 8/1988 |
| EP | 2196945 A2 | 6/2010 |
| JP | 2002074433 A | 3/2002 |
| JP | 2010140117 A | 6/2010 |

\* cited by examiner ns such as
CARD SUBSTITUTION PREVENTION METHOD AND APPARATUS FOR SELF-SERVICE TERMINAL This application is the national phase of International Application No. PCT/CN2014/088461, titled "CARD SUBSTITUTION PREVENTION METHOD AND APPARATUS FOR SELF-SERVICE TERMINAL", filed on Oct. 13, 2014, which claims the benefit of priority to Chinese patent application No. 201410067122.2, titled "CARD SUBSTITUTION PREVENTION METHOD AND APPARATUS FOR SELF-SERVICE TERMINAL", filed with the Chinese State Intellectual Property Office on Feb. 26, 2014, the entire disclosures of both applications are incorporated herein by reference.

FIELD

The present application relates to the field of financial transaction security, and particularly to a card substitution prevention method and apparatus.

BACKGROUND

With the rapid development of social economy, transactions between merchants and customers are increasingly frequent. Self-service terminals (such as ATM, i.e., automatic teller machine) are greatly favored by customers due to advantages such as being convenient and efficient, 24 hours self service, wide distribution, and etc.

In a conventional self-service terminal, for example an ATM, an irregular-shaped mouth is mounted on a port of a card reader to protect a bank card, prevent the bank card from dropping and prevent the bank card from being taken away by criminals. However, there is also a potential safety hazard. While a customer is operating at an interface to perform a transaction after inserting a bank card into the card reader and entering a password, if a lawbreaker, at this time, inserts a false card into the irregular-shaped mouth of the card reader and then tells the customer that the customer's bank card has exited, and the customer, upon seeing the false card in the irregular-shaped mouth of the card reader, would consider that his own bank card has exited, and then takes out the false card in the irregular-shaped mouth of the card reader and leaves. Actually, the bank card of the customer is still in the card reader and the correct password has been entered; at this time, the lawbreaker may perform a transaction and withdraw cash from the bank account of the customer. This is how the lawbreaker stealthily substitutes a false card for the bank card of the customer and steals cash from the bank account of the customer at present by utilizing the feature of the conventional card reader that a card can be inserted into the irregular-shaped mouth of the card reader.

Therefore, in the field of self-service terminals such as ATMs, it is required to provide a method for protecting a card of a customer and effectively preventing the card of the customer from being stealthily substituted, thereby improving the service quality of a self-service terminal and maintaining the trade credit of a merchant.

SUMMARY

A card substitution prevention method and apparatus for a self-service terminal are provided according to the present application, which can effectively protect a card of a customer and prevent the card of the customer from being stealthily substituted, thereby improving the service quality of the self-service terminal and maintaining the trade credit of a merchant.

A card substitution prevention method for a self-service terminal, includes:

performing, by a card feeding portion of the self-service terminal, an alteration operation in the case that a card exists in a card reader of the self-service terminal, to make the card feeding portion unable to receive another card and prevent the another card from being placed in the card feeding portion.

Optionally, performing, by the card feeding portion of the self-service terminal, an alteration operation to make the card feeding portion unable to receive another card and prevent the another card from being placed in the card feeding portion includes:

rotating the card feeding portion of the self-service terminal to cause an entrance of the card feeding portion to be misaligned with respect to a card feeding port of the card reader, to make the card feeding portion unable to receive another card and prevent the another card from being placed in the card feeding portion.

Optionally, rotating the card feeding portion of the self-service terminal includes:

rotating the card feeding portion of the self-service terminal upwards about a horizontal axis;

or, rotating the card feeding portion of the self-service terminal downwards about the horizontal axis.

Optionally, performing, by the card feeding portion of the self-service terminal, an alteration operation to make the card feeding portion unable to receive another card and prevent the another card from being placed in the card feeding portion includes:

locking, by a trigger switch provided in the card feeding portion of the self-service terminal, a card feeding port of the card reader, to make the card feeding portion unable to receive another card and prevent the another card from being placed in the card feeding portion and/or the card feeding port.

Optionally, the method further includes:

unlocking, by the trigger switch, the card feeding port of the card reader in the case that the card in the card reader is to be withdrawn, to allow the card to be withdrawn;

or, unlocking, by the trigger switch, the card feeding port of the card reader in the case that no card exists in the card reader after the card is retained by the self-service terminal.

Optionally, performing, by the card feeding portion of the self-service terminal, an alteration operation to make the card feeding portion unable to receive another card and prevent the another card from being placed in the card feeding portion includes:

closing a card feeding port of the card reader according to an operation of the card feeding portion of the self-service terminal, to make the card feeding portion unable to receive another card and prevent the another card from being placed in the card feeding portion and/or the card feeding port.

Optionally, the method further includes:

opening the card feeding port of the card reader according to an operation of the card feeding portion in the case that the card in the card reader is to be withdrawn, to allow the card to be withdrawn;

or, opening the card feeding port of the card reader according to an operation of the card feeding portion in the case that no card exists in the card reader after the card is retained by the self-service terminal.

A card substitution prevention apparatus for a self-service terminal, includes:

a detection module, configured to detect whether a card exists in a card reader of the self-service terminal and send a first trigger signal to a card prohibition control module if the detection module detects that a card exists in the card reader of the self-service terminal; and the card prohibition control module, configured to control a card feeding portion of the self-service terminal to perform an alteration operation upon receiving the first trigger signal, to make the card feeding portion unable to receive another card and prevent the another card from being placed in the card feeding portion.

Optionally, the card prohibition control module includes:

a rotation control unit, configured to control the card feeding portion of the self-service terminal to rotate upon receiving the first trigger signal, to cause an entrance of the card feeding portion to be misaligned with respect to a card feeding port of the card reader, to make the card feeding portion unable to receive another card and prevent the another card from being placed in the card feeding portion;

or, a lock control unit, configured to control a trigger switch provided in the card feeding portion of the self-service terminal to lock the card feeding port of the card reader upon receiving the first trigger signal, to make the card feeding portion unable to receive another card and prevent the another card from being placed in the card feeding portion and/or the card feeding port;

or, a closure control unit, configured to control the card feeding portion of the self-service terminal to perform an operation to close the card feeding port of the card reader upon receiving the first trigger signal, to make the card feeding portion unable to receive another card and prevent the another card from being placed in the card feeding portion and/or the card feeding port.

Optionally, the card substitution prevention apparatus further includes:

the detection module, further configured to detect whether a card exists in the card reader of the self-service terminal and send a second trigger signal to a recovery control module if the detection module detects that no card exists in the card reader of the self-service terminal; and the recovery control module, configured to control the card feeding portion of the self-service terminal to perform an alteration operation upon receiving the second trigger signal to allow the card feeding portion to receive another card.

According to the above technical solutions, the embodiments of the present application have the following advantages.

In this embodiment, in the case that a card exists in the card reader of the self-service terminal, the card feeding portion of the self-service terminal performs an alteration operation, such that the card feeding portion cannot receive another card and the another card cannot be placed in the card feeding portion. In this embodiment, after a card of a customer is inserted into the card reader, this card exists in the card reader of the self-service terminal, then the card feeding portion is altered to make a lawbreaker to unable to insert a false card into the card reader or place it in the card feeding portion, to prevent the card of the customer from being stealthily substituted by the false card of the lawbreaker, thereby effectively protecting the card of the customer and preventing the card of the customer from being stealthily substituted, and improving the service quality of the self-service terminal and maintaining the trade credit of a merchant.

DETAILED DESCRIPTION

A card substitution prevention method and apparatus for a self-service terminal are provided according to the present application, for effectively protecting a card of a customer and preventing the card of the customer from being stealthily substituted, thereby improving the service quality of the self-service terminal and maintaining the trade credit of a merchant.

For making the objects, features and advantages of the present application clearer and easier to be understood, the technical solutions according to the present application are described clearly and completely hereinafter in conjunction with the drawings in the embodiments of the present application. Apparently, the embodiments described hereinafter are only a part of the embodiments of the present application, rather than all embodiments. Based on the embodiments in the present application, all of other embodiments, made by the person skilled in the art without any creative efforts, fall into the scope of the present application.

Figure 1:
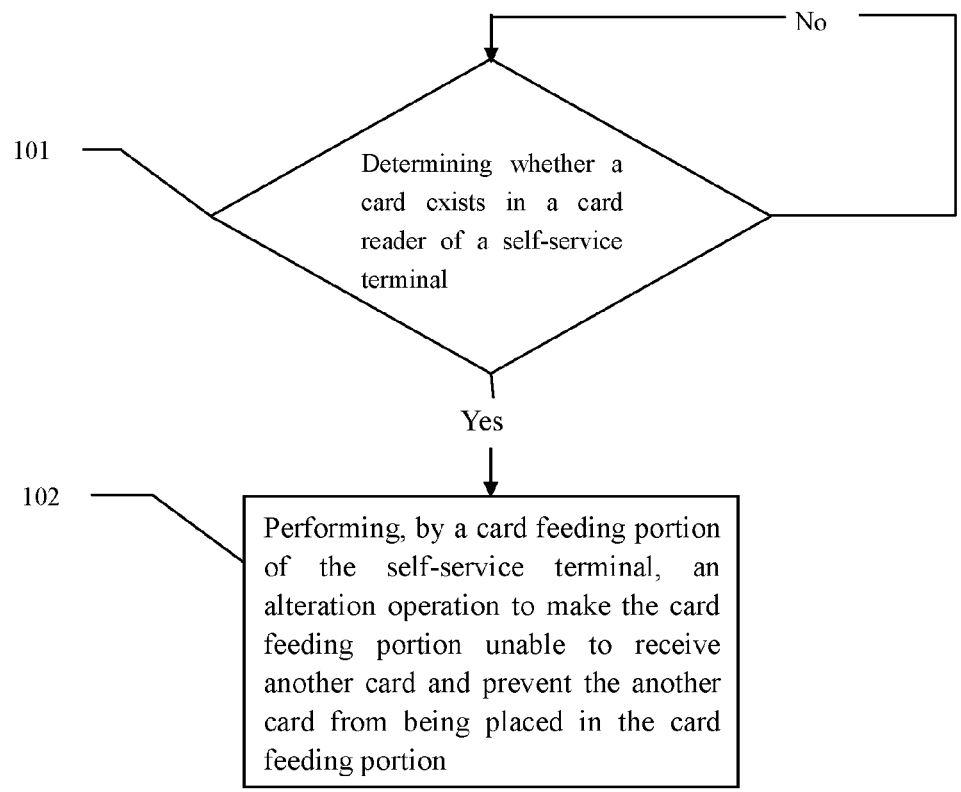
FIG. 1 is a flow chart of an embodiment of a card substitution prevention method for a self-service terminal according to the embodiments of the present application.

Referring to FIG. 1, an embodiment of a card substitution prevention method for a self-service terminal according to the present application includes steps 101 to 102.

Step 101 may include determining whether a card exists in a card reader of the self-service terminal; and performing step 102 if it is determined that a card exists in the card reader of the self-service terminal; and continuing to wait if it is determined that no card exists in the card reader of the self-service terminal.

Firstly, it may be determined whether a card exists in the card reader of the self-service terminal, and step 102 is performed if it is determined that a card exists in the card reader of the self-service terminal, and the self-service terminal continues to wait if it is determined that no card exists in the card reader of the self-service terminal.

Step 102 may include performing, by a card feeding portion of the self-service terminal, an alteration operation, to make the card feeding portion unable to receive another card and prevent the another card from being placed in the card feeding portion.

When it is known that a card exists in the card reader of the self-service terminal, it may be deemed that the self-service terminal is being used by a customer. Thus, the card feeding portion of the self-service terminal may perform an alteration operation, such that the card feeding portion cannot receive another card and the another card cannot be placed in the card feeding portion.

In this embodiment, in the case that a card exists in the card reader of the self-service terminal, the card feeding portion of the self-service terminal performs an alteration operation, such that the card feeding portion cannot receive another card and the another card cannot be placed in the card feeding portion. In this embodiment, after a card of a customer is inserted into the card reader, this card exists in the card reader of the self-service terminal, then the card feeding portion is altered to make a lawbreaker to unable to insert a false card into the card reader or place it in the card feeding portion, to prevent the card of the customer from being stealthily substituted by the false card of the lawbreaker, thereby effectively protecting the card of the customer and preventing the card of the customer from being stealthily substituted, and improving the service quality of the self-service terminal and maintaining the trade credit of a merchant.

Figure 2:
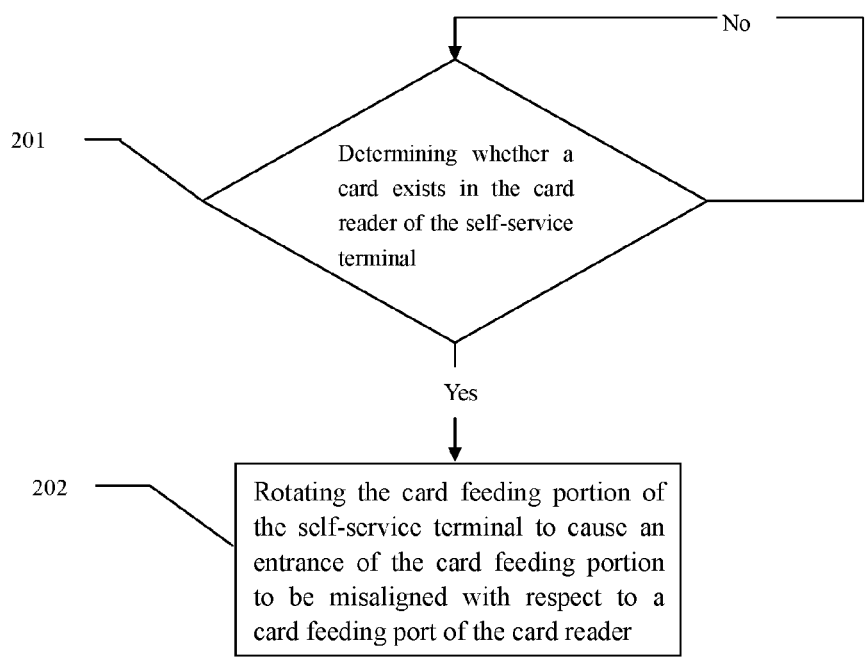
FIG. 2 is a flow chart of another embodiment of the card substitution prevention method for the self-service terminal according to the embodiments of the present application.

For ease of understanding, the card substitution prevention method for the self-service terminal according to the embodiments of the present application is described in detail below. Referring to FIG. 2, another embodiment of the card substitution prevention method for the self-service terminal according to the present application includes steps 201 to 202.

Step 201 may include determining whether a card exists in a card reader of the self-service terminal; and performing step 202 if it is determined that a card exists in the card reader of the self-service terminal; and continuing to wait if it is determined that no card exists in the card reader of the self-service terminal.

Firstly, it may be determined whether a card exists in the card reader of the self-service terminal, and step 202 is performed if it is determined that a card exists in the card reader of the self-service terminal, and the self-service terminal continues to wait if it is determined that no card exists in the card reader of the self-service terminal.

Step 202 may include rotating a card feeding portion of the self-service terminal to cause an entrance of the card feeding portion to be misaligned with respect to a card feeding port of the card reader, to make the card feeding portion unable to receive another card and prevent the another card from being placed in the card feeding portion.

When it is known that a card exists in the card reader of the self-service terminal, it may be deemed that the self-service terminal is being used by a customer. Thus, the card feeding portion of the self-service terminal may be rotated to cause the entrance of the card feeding portion to be misaligned with respect to the card feeding port of the card reader, such that the card feeding portion cannot receive another card and the another card cannot be placed in the card feeding portion.

It may be understood that in the case that no card exists in the card reader, i.e., the self-service terminal is not being used, the entrance of the card feeding portion and the card feeding port of the card reader are aligned with respect to each other and thus a card may be inserted into the card reader through the entrance of the card feeding portion and the card feeding port of the card reader. After a card is inserted into the card reader, the entrance of the card feeding portion is misaligned with respect to the card feeding port of the card reader. Thus, other cards cannot pass through the entrance of the card feeding portion and the card feeding port of the card reader at the same time, and thus other cards cannot be inserted into the card reader. Meanwhile, the entrance of the card feeding portion may be closed after the card feeding portion is rotated to be misaligned with respect to the card feeding port of the card reader, thus another card cannot be inserted into the card feeding portion by a sufficient depth and the another card cannot be placed firmly in the card feeding portion.

It is to be noted that, the card feeding portion of the self-service terminal may be rotated upwards about a horizontal axis and may also be rotated downwards about the horizontal axis.

In this embodiment, in the case that a card exists in the card reader of the self-service terminal, the card feeding portion of the self-service terminal is rotated to cause the entrance of the card feeding portion to be misaligned with respect to the card feeding port of the card reader, such that the card feeding portion cannot receive another card and the another card cannot be placed in the card feeding portion. In this embodiment, after a card of a customer is inserted into the card reader, this card exists in the card reader of the self-service terminal, then the card feeding portion is rotated to make a lawbreaker to unable to insert a false card into the card reader or place it in the card feeding portion, to prevent the card of the customer from being stealthily substituted by the false card of the lawbreaker, thereby effectively protecting the card of the customer and preventing the card of the customer from being stealthily substituted, and improving the service quality of the self-service terminal and maintaining the trade credit of a merchant.

Figure 3:
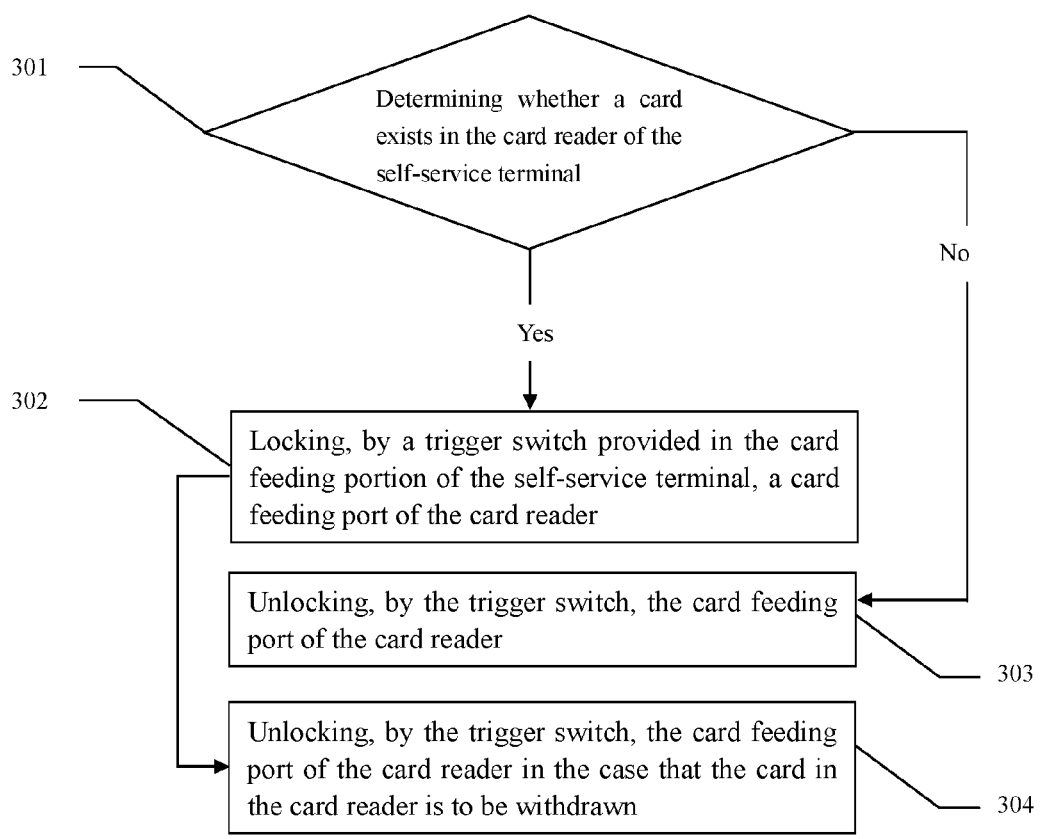
FIG. 3 is a flow chart of another embodiment of the card substitution prevention method for the self-service terminal according to the embodiments of the present application.

The solution in which the card feeding portion is altered by means of rotation has been mainly described hereinabove. A card substitution prevention method for the self-service terminal is described below in detail in which the card feeding portion is provided with a trigger switch to perform an alteration operation. Referring to FIG. 3, another embodiment of the card substitution prevention method for the self-service terminal according to the present application includes steps 301 to 304.

Step 301 may include determining whether a card exists in the card reader of the self-service terminal; and performing step 302 if it is determined that a card exists in the card reader of the self-service terminal; and performing step 303 if it is determined that no card exists in the card reader of the self-service terminal.

Firstly, it may be determined whether a card exists in the card reader of the self-service terminal. If it is determined that a card exists in the card reader of the self-service terminal, it may be deemed that the self-service terminal is being used, and step 302 may be performed at this time. If it is determined that no card exists in the card reader of the self-service terminal, it may be deemed that the self-service terminal is not being used, and step 303 may be performed.

Step 302 may include locking, by a trigger switch of a card feeding portion of the self-service terminal, a card feeding port of the card reader, to make the card feeding portion unable to receive another card and prevent the another card from being placed in the card feeding portion and/or the card feeding port.

When it is known that a card exists in the card reader of the self-service terminal, it may be deemed that the self-service terminal is being used by a customer. Thus, the trigger switch provided in the card feeding portion of the self-service terminal locks the card feeding port of the card reader, such that the card feeding portion cannot receive another card and the another card cannot be placed in the card feeding portion and/or the card feeding port.

It may be understood that, in the case that no card exists in the card reader, i.e., the self-service terminal is not being used, the trigger switch is switched on and the card feeding port of the card reader can receive a card. After a card is inserted into the card reader, the trigger switch locks the card feeding port of the card reader, thus other cards cannot be inserted into the card reader. The trigger switch may simply be a pin provided at the card feeding port of the card reader and may also be a baffle, and the trigger switch may have any structure as long as there is no sufficient space for a card to enter into the card feeding port after the trigger switch locks the card feeding port.

Step 303 may include unlocking, by the trigger switch, the card feeding port of the card reader.

When it is known that no card exists in the card reader of the self-service terminal, it may be deemed that the card in the self-service terminal has been retained by the self-service terminal. Then the trigger switch unlocks the card feeding port of the card reader and thus other cards can be inserted into the card reader.

Step 304 may include unlocking, by the trigger switch, the card feeding port of the card reader in the case that the card in the card reader is to be withdrawn, to allow the card to be withdrawn.

After a customer has inserted a card and has performed business transactions or business processes on the self-service terminal, the customer needs to withdraw the card, and the customer may perform a card withdrawing operation on the self-service terminal, then the trigger switch unlocks the card feeding port of the card reader when the card in the card reader is to be withdrawn, thus the card can be withdrawn.

Figure 4:
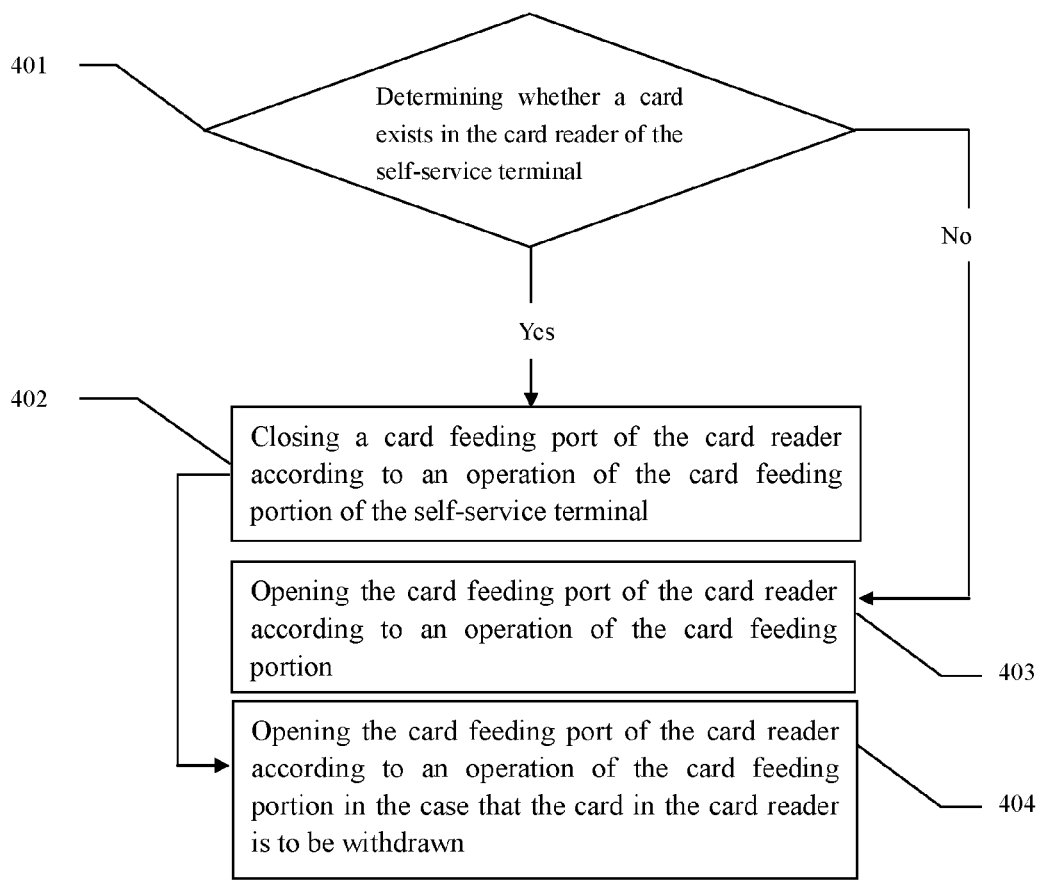
FIG. 4 is a flow chart of another embodiment of the card substitution prevention method for the self-service terminal according to the embodiments of the present application.

The solution in which the card feeding portion is altered by means of a trigger switch has been mainly described hereinabove. A card substitution prevention method for the self-service terminal is described below in detail in which a card feeding port of a card reader may be opened or closed. Referring to FIG. 4, another embodiment of the card substitution prevention method for the self-service terminal according to the present application includes steps 401 to 404.

Step 401 may include determining whether a card exists in a card reader of the self-service terminal; and performing step 402 if it is determined that a card exists in the card reader of the self-service terminal; and performing step 403 if it is determined that no card exists in the card reader of the self-service terminal.

Firstly, it may be determined whether a card exists in the card reader of the self-service terminal. If it is determined that a card exists in the card reader of the self-service terminal, it may be deemed that the self-service terminal is being used, and step 402 may be performed at this time. If it is determined that no card exists in the card reader of the self-service terminal, it may be deemed that the self-service terminal is not being used, and step 403 may be performed.

Step 402 may include closing a card feeding port of the card reader by an operation of a card feeding portion of the self-service terminal, to make the card feeding portion unable to receive another card and prevent the another card from being placed in the card feeding portion and/or the card feeding port.

When it is known that a card exists in the card reader of the self-service terminal, it may be deemed that the self-service terminal is being used by a customer. Thus, the card feeding portion of the self-service terminal performs an operation to close the card feeding port of the card reader, thus the card feeding portion cannot receive another card and the another card cannot be placed in the card feeding portion and/or the card feeding port.

It may be understood that, in the case that no card exists in the card reader, i.e., the self-service terminal is not being used, the card feeding port of the card reader is opened and the card feeding port of the card reader can receive a card. After a card is inserted into the card reader, the card feeding portion performs an operation to close the card feeding port of the card reader, thus other cards cannot be inserted into the card reader. The closing of the card feeding port may be embodied as closing of a double door switch of the card feeding port of the card reader, or may also be achieved by blocking the card feeding port with a closed movable baffle, and the closing of the card feeding port may be realized in any manner as long as the card feeding port can be closed.

Step 403 may include opening the card feeding port of the card reader by an operation of the card feeding portion.

When it is known that no card exists in the card reader of the self-service terminal, it may be deemed that the card in the self-service terminal has been retained by the self-service terminal. Then the card feeding portion performs an operation to open the card feeding port of the card reader, thus other cards can be inserted into the card reader.

Step 404 may include opening the card feeding port of the card reader by an operation of the card feeding portion in the case that the card in the card reader is to be withdrawn, to allow the card to be withdrawn.

After a customer has inserted a card and has performed business transactions or business processes on the self-service terminal, the customer needs to withdraw the card, then the customer may perform a card withdrawing operation on the self-service terminal, and when the card in the card reader is to be withdrawn, the card feeding portion performs an operation to open the card feeding port of the card reader, thus the card can be withdrawn.

For ease of understanding, based on the embodiment described in FIG. 4, the card substitution prevention method for the self-service terminal according to the embodiments of the present application is described below in a practical application scenario.

A: a card feeding port of a card reader of a self-service terminal is in an open state and an entrance of a card feeding portion is also in an open state.

B: a customer uses the self-service terminal, inserts a card into the card feeding port of the card reader via the entrance of the card feeding portion, and the card enters into the card reader.

C: after the card has existed in the card reader, a double door switch of the card feeding port of the card reader is closed, i.e., the card feeding port of the card reader is closed, and at this time, if a lawbreaker intends to cheat the customer with a false card, the lawbreaker would find that the false card cannot be inserted into the card feeding port and also cannot be placed at the position of the card feeding port, and if being forcibly placed at the position of the card feeding portion, the false card would drop, therefore, the lawbreaker cannot stealthily substitute the card of the customer with the false card.

D: after the customer used the self-service terminal and needs to withdraw the card, a card withdrawing operation is performed on the self-service terminal, the double door switch of the card feeding port of the card reader is opened and the card is withdrawn, thus the customer completes the transaction safely.

E: if the card is retained by the self-service terminal after the customer inserts the card into the card reader, at this time the self-service terminal would give a card retaining prompt and the double door switch of the card feeding port of the card reader is opened again to wait to be used by a next customer.

Figure 5:
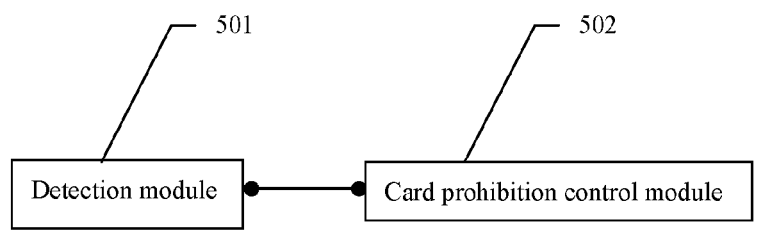
FIG. 5 is a structural view of an embodiment of a card substitution prevention apparatus for a self-service terminal according to the embodiments of the present application.

The card substitution prevention method for the self-service terminal has been mainly described hereinabove. A card substitution prevention apparatus for a self-service terminal is described below in detail. Referring to FIG. 5, an embodiment of the card substitution prevention apparatus for the self-service terminal according to the present application includes a detection module 501 and a card prohibition control module 502.

The detection module 501 is configured to detect whether a card exists in a card reader of the self-service terminal and send a first trigger signal to the card prohibition control module 502 if it detects that a card exists in the card reader of the self-service terminal.

The card prohibition control module 502 is configured to control a card feeding portion of the self-service terminal to perform an alteration operation upon receiving the first trigger signal, to make the card feeding portion unable to receive another card and prevent the another card from being placed in the card feeding portion.

In this embodiment, the detection module 501 detects whether a card exists in the card reader of the self-service terminal and sends the first trigger signal to the card prohibition control module 502 if it detects that a card exists in the card reader of the self-service terminal. Then the card prohibition control module 502 controls the card feeding portion of the self-service terminal to perform an alteration operation upon receiving the first trigger signal, to make the card feeding portion unable to receive another card, and the another card cannot be placed in the card feeding portion. In this embodiment, when a card of a customer is inserted into the card reader, this card exists in the card reader of the self-service terminal, then the card prohibition control module 502 controls the card feeding portion to perform an alteration operation, to make a lawbreaker to unable to insert a false card into the card reader or place it in the card feeding portion, to prevent the card of the customer from being stealthily substituted by the false card of the lawbreaker, thereby effectively protecting the card of the customer and preventing the card of the customer from being stealthily substituted, and improving the service quality of the self-service terminal and maintaining the trade credit of a merchant.

Figure 6:
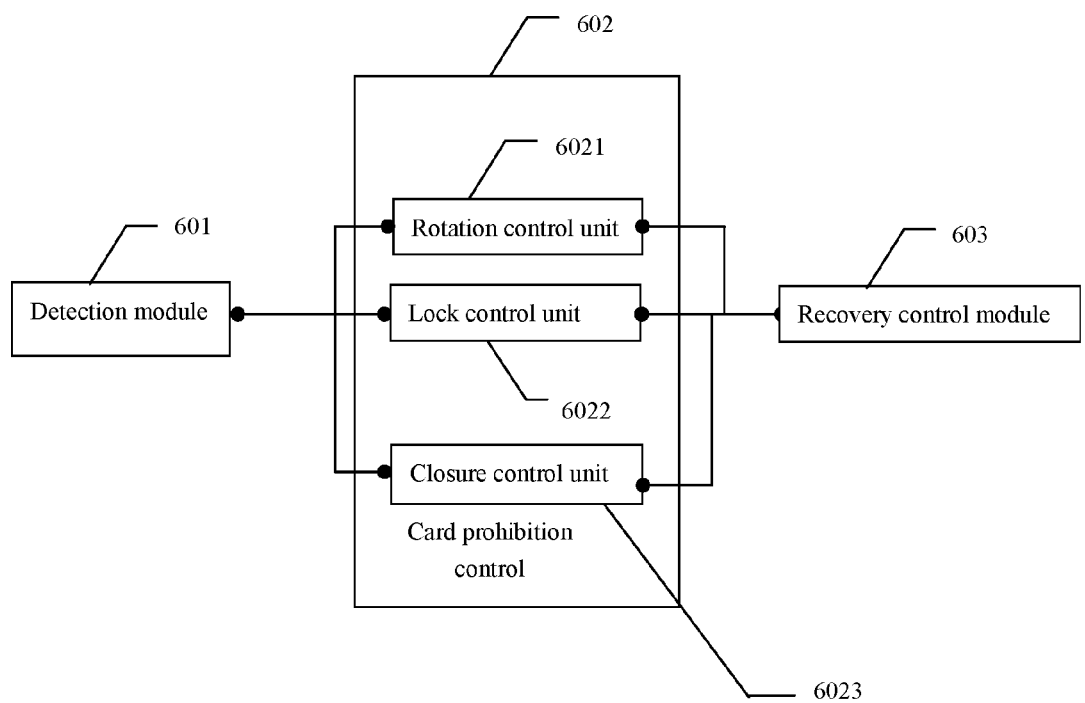
FIG. 6 is a structural view of another embodiment of the card substitution prevention apparatus for the self-service terminal according to the embodiments of the present application.

For ease of understanding, the card substitution prevention apparatus for the self-service terminal according to the embodiments of the present application is described below in detail. Referring to FIG. 6, another embodiment of the card substitution prevention apparatus for the self-service terminal according to the present application includes a detection module 601 and a card prohibition control module 602.

The detection module 601 is configured to detect whether a card exists in a card reader of the self-service terminal and send a first trigger signal to the card prohibition control module 602 if it detects that a card exists in the card reader of the self-service terminal.

The card prohibition control module 602 is configured to control a card feeding portion of the self-service terminal to perform an alteration operation upon receiving the first trigger signal, to make the card feeding portion unable to receive another card and prevent the another card from being placed in the card feeding portion.

In this embodiment, the card prohibition control module 602 specifically includes a rotation control unit 6021, or a lock control unit 6022, or a closure control unit 6023.

The rotation control unit 6021 is configured to control the card feeding portion of the self-service terminal to rotate upon receiving the first trigger signal, to cause an entrance of the card feeding portion to be misaligned with respect to the card feeding port of the card reader, thus the card feeding portion cannot receive another card and the another card cannot be placed in the card feeding portion.

The lock control unit 6022 is configured to control a trigger switch provided in the card feeding portion of the self-service terminal to lock the card feeding port of the card reader upon receiving the first trigger signal, thus the card feeding portion cannot receive another card and the another card cannot be placed in the card feeding portion and/or the card feeding port.

The closure control unit 6023 is configured to control the card feeding portion of the self-service terminal to perform an operation to close the card feeding port of the card reader upon receiving the first trigger signal, thus the card feeding portion cannot receive another card and the another card cannot be placed in the card feeding portion and/or the card feeding port.

In this embodiment, the card substitution prevention apparatus for the self-service terminal further includes the detection module 601, and a recovery control module 603.

The detection module 601 is further configured to detect whether a card exists in the card reader of the self-service terminal and send a second trigger signal to the recovery control module 603 if it detects that no card exists in the card reader of the self-service terminal.

The recovery control module 603 is configured to control the card feeding portion of the self-service terminal to perform an alteration operation upon receiving the second trigger signal, to allow the card feeding portion to receive another card.

In this embodiment, the detection module 601 detects whether a card exists in the card reader of the self-service terminal and sends the first trigger signal to the card prohibition module 602 if it detects that a card exists in the card reader of the self-service terminal. Then the card prohibition module 602, upon receiving the first trigger signal, controls the card feeding portion of the self-service terminal to perform an alteration operation to make the card feeding portion unable to receive another card and prevent the another card from being placed in the card feeding portion. In this embodiment, when a card of a customer is inserted into the card reader, this card exists in the card reader of the self-service terminal, then the card prohibition control module 602 controls the card feeding portion to perform an alteration operation, to make a lawbreaker to unable to insert a false card into the card reader or place it in the card feeding portion, to prevent the card of the customer from being stealthily substituted by the false card of the lawbreaker, thereby effectively protecting the card of the customer and preventing the card of the customer from being stealthily substituted, and improving the service quality of the self-service terminal and maintaining the trade credit of a merchant.

For ease of understanding, based on the embodiment shown described in FIG. 6, the card prohibition control module of the card substitution prevention apparatus for the self-service terminal according to the present application is described below in a practical application scenario.

Figure 7:
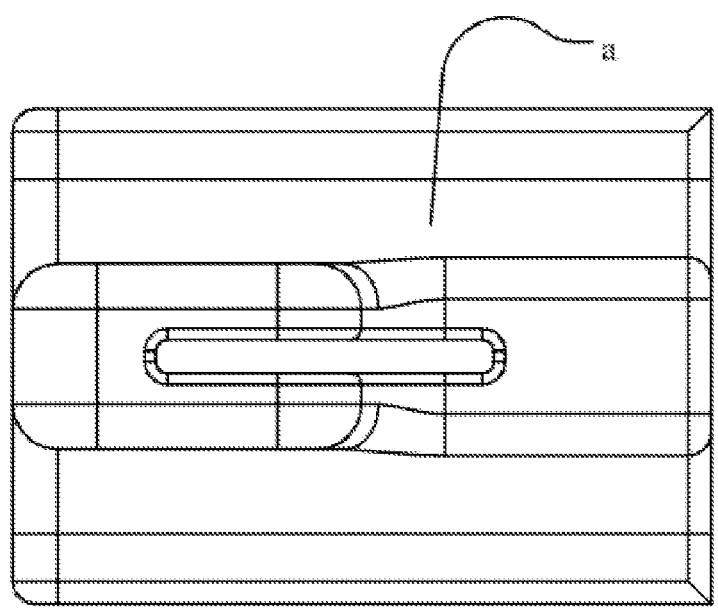
FIG. 7 is a schematic view showing one structure of the card substitution prevention apparatus for the self-service terminal according to the embodiments of the present application.
Figure 8:
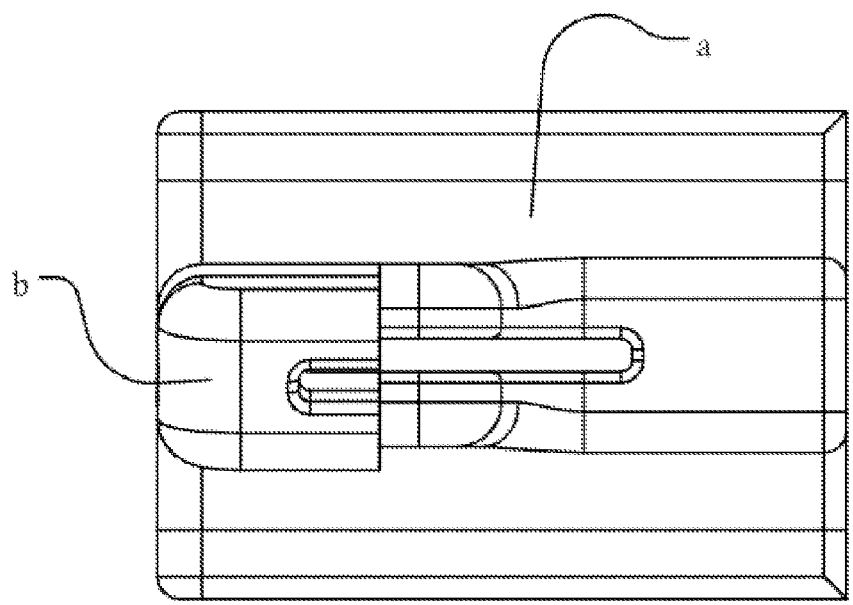
FIG. 8 is a schematic view showing another structure of the card substitution prevention apparatus for the self-service terminal according to the embodiments of the present application.

A first embodiment of the control of the card feeding portion of the self-service terminal when the rotation control unit in the card prohibition control module is in operation includes the following steps:

S1) an irregular-shaped mouth of the card feeding portion is shown in FIG. 7 in the case that no bank card is inserted, and the irregular-shaped mouth a is in an open state;

S2) as shown in FIG. 8, a card feeding portion b is rotated by a certain angle in the case that a sensor detects that a bank card is inserted into the self-service terminal, to allow the irregular-shaped mouth to be in a closed state and prevent another card from being inserted into the card feeding portion b;

S3) the card feeding portion b is reversely rotated in the case that the customer ends the service of the self-service terminal and the system receives a card withdrawing instruction, to allow the irregular-shaped mouth to be in the open state as shown in FIG. 7;

S4) thus, the bank card of the customer may be withdrawn smoothly.

Figure 9:
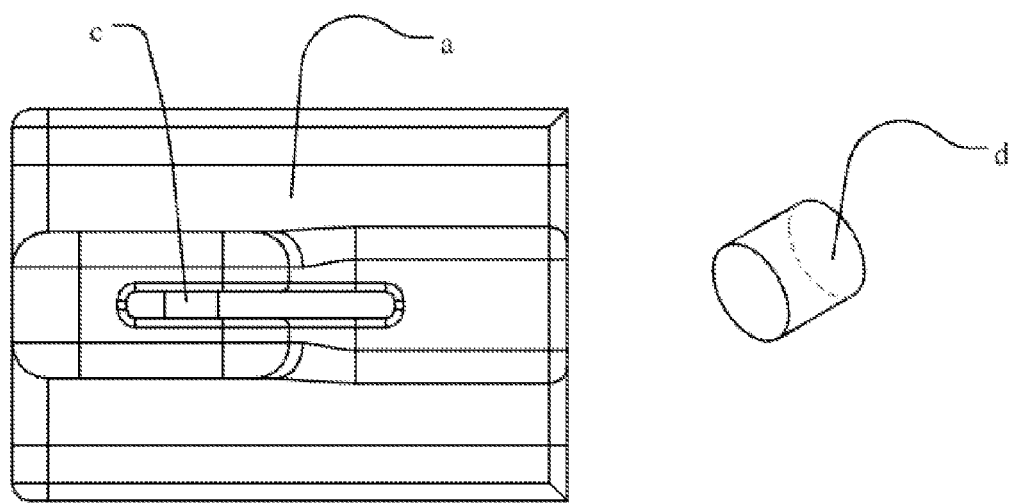
FIG. 9 is a schematic view showing another structure of the card substitution prevention apparatus for the self-service terminal according to the embodiments of the present application.

A second embodiment of the control of the card feeding portion of the self-service terminal when the lock control unit in the card prohibition control module is in operation includes the following steps:

S1) an irregular-shaped mouth of the card feeding portion is shown in FIG. 7 in the case that no bank card is inserted, and the irregular-shaped mouth a is in an open state;

S2) as shown in FIG. 9, a lock c of the card feeding portion is moved up and down in the case that a sensor detects that a bank card is inserted into the self-service terminal, to allow the irregular-shaped mouth to be in a closed state and prevent another card from being inserted into the card feeding portion;

S3) the lock c is moved reversely in the case that the customer ends the service of the self-service terminal and the system receives a card withdrawing instruction, to allow the irregular-shaped mouth to be in the open state as shown in FIG. 7, in which, a cylindrical pin d is a portion of the lock c that is movable up and down and other components of the lock c are not indicated;

S4) thus, the bank card of the customer may be withdrawn smoothly.

A third embodiment of the control of the card feeding portion of the self-service terminal when the closure control unit in the card prohibition control module is in operation includes the following steps.

S1) an irregular-shaped mouth of the card feeding portion is shown in FIG. 7 in the case that no bank card is inserted, and the irregular-shaped mouth a is in an open state.

Figure 10:
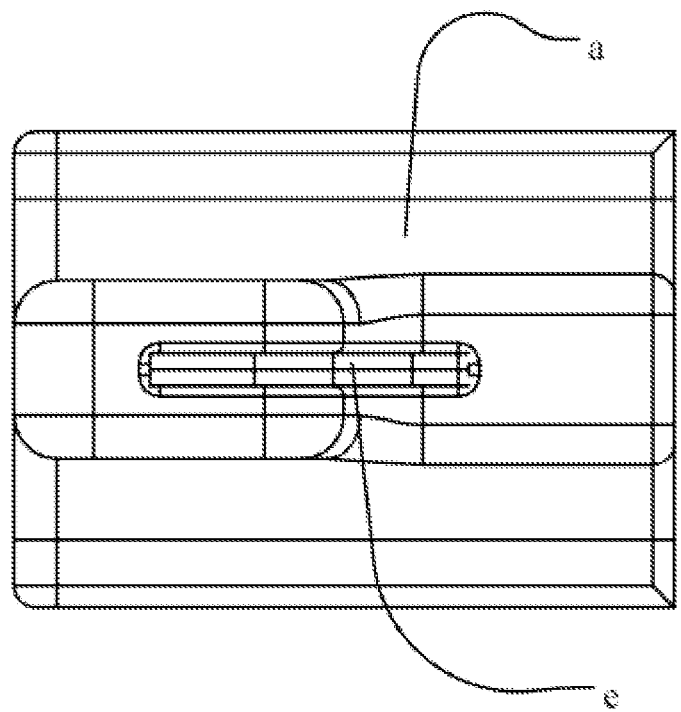
FIG. 10 is a schematic view showing another structure of the card substitution prevention apparatus for the self-service terminal according to the embodiments of the present application.

S2) as shown in FIG. 10, a double door switch e of a card feeding port is moved vertically to be closed in the case that a sensor detects that a bank card is inserted into the self-service terminal, to allow the irregular-shaped mouth to be in a closed state and prevent another card from being inserted into the card feeding port;

S3) the double door switch e is moved vertically to be opened in the case that the customer ends the service of the self-service terminal and the system receives a card withdrawing instruction, to allow the irregular-shaped mouth to be in the open state as shown in FIG. 7.

S4) thus, the bank card of the customer may be withdrawn smoothly.

The person skilled in the art may clearly know that, for convenience and concise of the description, the specific working process of the system, device, and unit described above may refer to the corresponding process in the embodiment of the method described above, which will not be described herein again.

In the several embodiments provided by the present application, it should be appreciated that, the system, the device and the method disclosed herein may be implemented in other manners. For example, the embodiments of the device described above are only schematic. For example, the division of the units is only a division on logical function, and there may be other division modes in the practical implementation, for instance, multiple units or components may be combined, or may be integrated into another system; and some features may be omitted or unperformed. In addition, the coupling, direct coupling or communication connection between the components displayed or discussed above may be realized by some interfaces. The indirect coupling or communication connection between the devices or units may be electrical, mechanical or other forms.

The above unit described as a separate component may be or may be not separate physically. The component displayed as a unit may be or may be not a physical unit, that is, may be located at one place or may be distributed on multiple network units. The object of the solutions of the embodiments may be achieved by selecting a part or all of the units according to the practical needs.

Furthermore, various function units in the embodiments of the present application may be integrated in one processing unit; or, each of the function units may be a single physical presence; or two or more function units are integrated in one unit. The above integrated unit may be realized in a form of hardware or in a form of software function unit.

In the case that the integrated unit is implemented in the form of software functional unit and is sold or used as a separate product, it can also be stored in a computer readable storage medium. Based on such understanding, the essence or the part that contributes to the conventional technology of the technical solutions of the present application or a part or whole of the technical solutions may be expressed in the form of a software product. The computer software product is stored in a storage medium, and includes several instructions which enables a computer device (which may be a personal computer, a server, or a network device, and etc.) to execute all or a part of the steps of the method of each embodiment of the present application. The storage medium described above includes various medium capable of storing program codes, such as a USB flask disk, a movable hard disk, a Read-Only Memory (ROM), a Random Access Memory (RAM), a magnetic disc or an optical disc.

The above description and the above embodiments only intend to illustrate the technical solutions of the present application, and are not intended to limit the technical solutions of the present application. Though the present application has been described in detail with reference to the above embodiments, it should be understood by the person skilled in the art that, modifications may be made to the technical solutions described in the various embodiments described above, or equivalent substitutions may be made to a part of the technical features in the above embodiments; and all these modifications or substitutions do not make the essence of the respective technical solutions depart from the spirit and scope of the technical solutions of the embodiments of the present application.

What is claimed is:

1. A card substitution prevention method for a self-service terminal, comprising:
performing, by a card feeding portion of the self-service terminal, an alteration operation in the case that a card exists in a card reader of the self-service terminal, to make the card feeding portion unable to receive another card and prevent the another card from being placed in the card feeding portion;
wherein performing, by the card feeding portion of the self-service terminal, an alteration operation to make the card feeding portion unable to receive another card and prevent the another card from being placed in the card feeding portion comprises:
rotating the card feeding portion of the self-service terminal to cause an entrance of the card feeding portion to be misaligned with respect to a card feeding port of the card reader, to make the card feeding portion unable to receive another card and prevent the another card from being placed in the card feeding portion.

2. The method according to claim 1, wherein rotating the card feeding portion of the self-service terminal comprises:
rotating the card feeding portion of the self-service terminal upwards about a horizontal axis;
or,
rotating the card feeding portion of the self-service terminal downwards about the horizontal axis.

3. The method according to claim 1, wherein performing, by the card feeding portion of the self-service terminal, an alteration operation to make the card feeding portion unable to receive another card and prevent the another card from being placed in the card feeding portion comprises:
locking, by a trigger switch provided in the card feeding portion of the self-service terminal, a card feeding port of the card reader, to make the card feeding portion unable to receive another card and prevent the another card from being placed in the card feeding portion and/or the card feeding port.

4. The method according to claim 3, further comprising:
unlocking, by the trigger switch, the card feeding port of the card reader in the case that the card in the card reader is to be withdrawn, to allow the card to be withdrawn;
or,
unlocking, by the trigger switch, the card feeding port of the card reader in the case that no card exists in the card reader after the card is retained by the self-service terminal.

5. The method according to claim 1, wherein performing, by the card feeding portion of the self-service terminal, an alteration operation to make the card feeding portion unable to receive another card and prevent the another card from being placed in the card feeding portion comprises:
closing a card feeding port of the card reader according to an operation of the card feeding portion of the self-service terminal, to make the card feeding portion unable to receive another card and prevent the another card from being placed in the card feeding portion and/or the card feeding port.

6. The method according to claim 5, further comprising:
opening the card feeding port of the card reader according to an operation of the card feeding portion in the case that the card in the card reader is to be withdrawn, to allow the card to be withdrawn;
or,
opening the card feeding port of the card reader according to an operation of the card feeding portion in the case that no card exists in the card reader after the card is retained by the self-service terminal.

7. A card substitution prevention apparatus for a self-service terminal, comprising:
a detection module, configured to detect whether a card exists in a card reader of the self-service terminal and send a first trigger signal to a card prohibition control module if the detection module detects that a card exists in the card reader of the self-service terminal; and
the card prohibition control module, configured to control a card feeding portion of the self-service terminal to perform an alteration operation upon receiving the first trigger signal, to make the card feeding portion unable to receive another card and prevent the another card from being placed in the card feeding portion;
wherein the card prohibition control module comprises:
a rotation control unit, configured to control the card feeding portion of the self-service terminal to rotate upon receiving the first trigger signal, to cause an entrance of the card feeding portion to be misaligned with respect to a card feeding port of the card reader, to make the card feeding portion unable to receive another card and prevent the another card from being placed in the card feeding portion.

8. The card substitution prevention apparatus for the self-service terminal according to claim 7, wherein the card prohibition control module comprises:
a lock control unit, configured to control a trigger switch provided in the card feeding portion of the self-service terminal to lock the card feeding port of the card reader upon receiving the first trigger signal, to make the card feeding portion unable to receive another card and prevent the another card from being placed in the card feeding portion and/or the card feeding port;
or,
a closure control unit, configured to control the card feeding portion of the self-service terminal to perform an operation to close the card feeding port of the card reader upon receiving the first trigger signal, to make the card feeding portion unable to receive another card and prevent the another card from being placed in the card feeding portion and/or the card feeding port.

9. The card substitution prevention apparatus for the self-service terminal according to claim 8, further comprising:
the detection module, further configured to detect whether a card exists in the card reader of the self-service terminal and send a second trigger signal to a recovery control module if the detection module detects that no card exists in the card reader of the self-service terminal; and
the recovery control module, configured to control the card feeding portion of the self-service terminal to perform an alteration operation upon receiving the second trigger signal to allow the card feeding portion to receive another card.

10. The card substitution prevention apparatus for the self-service terminal according to claim 7, further comprising:
the detection module, further configured to detect whether a card exists in the card reader of the self-service terminal and send a second trigger signal to a recovery control module if the detection module detects that no card exists in the card reader of the self-service terminal; and the recovery control module, configured to control the card feeding portion of the self-service terminal to perform an alteration operation upon receiving the second trigger signal to allow the card feeding portion to receive another card.

* * * * *